(12) United States Patent
Crane et al.

(10) Patent No.: US 8,049,358 B2
(45) Date of Patent: Nov. 1, 2011

(54) MARINE POWER DISTRIBUTION AND PROPULSION SYSTEMS

(75) Inventors: Allan David Crane, Rugby (GB); Clive Lewis, Rugby (GB)

(73) Assignee: Converteam Technology Ltd, Warwickshire (GB)

( * ) Notice: Subject to any disclaimer, the term of this patent is extended or adjusted under 35 U.S.C. 154(b) by 880 days.

(21) Appl. No.: 12/006,910

(22) Filed: Jan. 7, 2008

(65) Prior Publication Data
US 2010/0283318 A1   Nov. 11, 2010

Related U.S. Application Data

(63) Continuation-in-part of application No. 11/974,569, filed on Oct. 15, 2007.

(51) Int. Cl.
*B60L 1/00* (2006.01)
*B60L 3/00* (2006.01)
*H02G 3/00* (2006.01)

(52) U.S. Cl. ......................................... 307/9.1
(58) Field of Classification Search ................... 307/9.1, 307/46, 80; 290/4 R; 440/6
See application file for complete search history.

(56) References Cited

U.S. PATENT DOCUMENTS
5,199,912 A * 4/1993 Dade et al. ......................... 440/6
7,710,081 B2 * 5/2010 Saban et al. ..................... 322/89

FOREIGN PATENT DOCUMENTS
| | | |
|---|---|---|
| EP | 0 536 876 A1 | 4/1993 |
| EP | 1 022 218 A2 | 7/2000 |
| EP | 1 909 376 A1 | 9/2008 |
| GB | 2 443 002 A | 4/2008 |
| SG | 200708848-7 | 5/2008 |
| WO | WO 2007/013207 A1 | 2/2007 |

* cited by examiner

*Primary Examiner* — Jared Fureman
*Assistant Examiner* — Carlos Amaya
(74) *Attorney, Agent, or Firm* — Kirschstein, et al.

(57) ABSTRACT

A power distribution system that can be used in naval ships and submarines includes a first propulsion drive system including a propulsion motor having superconducting (preferably high temperature superconducting (HTS)) rotor windings and a power converter. A first propulsion power generation system supplies power to the first propulsion drive system and includes a generator having superconducting (preferably HTS) rotor windings and a power converter. A first power generation system includes a power source for supplying power to a first service distribution system that includes a dc distribution busbar (optionally implemented using HTS cabling or busbar) for carrying a distribution voltage and a distribution current, and a switchboard that includes protective switchgear with contacts. A power converter is used to connect the power source to the switchboard. The power converters are regulated according to a power source foldback and stabilizing characteristic. An electric load is supplied with power from a zonal power supply unit that forms part of a zonal power distribution sub-system. The electric load and the propulsion motor are regulated according to a load shedding and stabilizing characteristic.

47 Claims, 6 Drawing Sheets

Figure 1

*Prior Art*

MARINE POWER DISTRIBUTION AND PROPULSION SYSTEMS

CROSS REFERENCE TO RELATED APPLICATION

This application is a continuation-in-part of U.S. patent application Ser. No. 11/974,569 filed Oct. 15, 2007.

FIELD OF THE INVENTION

The present invention relates to a marine power distribution and propulsion system, and in particular to a system that can achieve maximum power density, efficiency and stability and facilitates future technology insertions by means of a modular approach and standard interfaces.

BACKGROUND OF THE INVENTION

In conventional marine power distribution and propulsion systems that employ full electric propulsion (FEP), fault current magnitude-time discrimination is used to enable protective switchgear to interrupt over-current faults in particular sub-circuits whilst causing the minimum practical disruption to all other sub-circuits. Such FEP systems are said to employ the "power station principle" where the aim is to adapt the power generation capacity that is on-line at any particular time to the total load that is being drawn at that time. This has the effect of maximizing fuel efficiency. The configuration of such FEP systems is normally automated to some degree by a power management system with the authority to shed load and start generators in a prioritized manner. Alternating current is distributed through the FEP systems at medium voltage (MV) to maintain compatibility with land-based systems.

Figure 1:
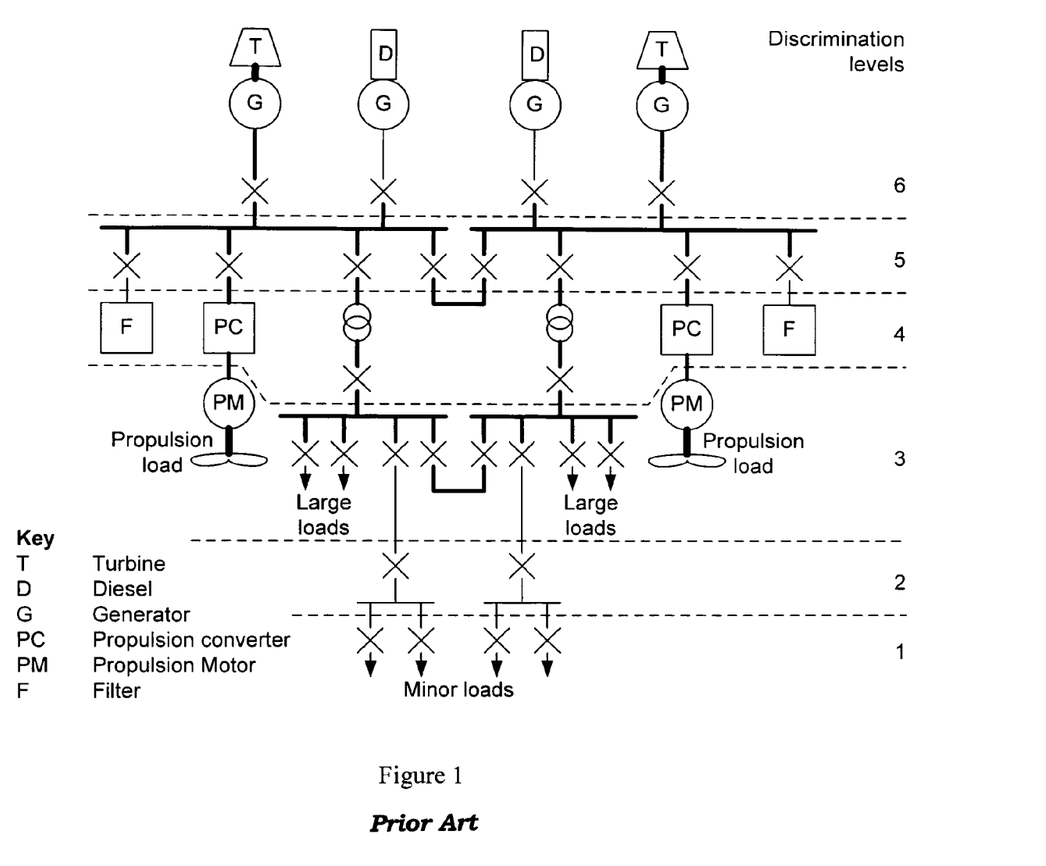
FIG. 1 is a schematic diagram of a conventional marine power distribution and propulsion system that employs full electric propulsion (FEP)

An example of a conventional FEP system is shown in FIG. 1. A series of turbines T and diesel engines D are used to power individual generators G. These supply ac power to the FEP system through a medium voltage (MV) ac busbar system that is equipped with protective switchgear. The protective switchgear comprise circuit breakers and associated controls and are represented in FIG. 1 by the × symbol. Power converters PC are used to interface the MV ac busbar system to an electric propulsion motor PM that drives a propeller. Filters F are also connected to the MV ac busbar system. The MV ac busbar system is divided into a first MV ac busbar and a second ac MV busbar that are interconnected by protective switchgear. A first low voltage (LV) ac busbar is connected to the first MV ac busbar through a first transformer. A second LV ac busbar is connected to the second MV ac busbar through a second transformer. The first and second LV ac busbars are interconnected by protective switchgear. A series of unspecified large and minor loads can be connected to the first and second LV ac busbars, respectively. It will be clear from FIG. 1 that the minor loads are connected to the first and second LV ac busbars through first and second minor LV ac busbars.

Six magnitude-time discrimination levels of the FEP system are shown along the right hand side of FIG. 1. Protective switchgear is represented by the × symbol in each of the discrimination levels. For example, in discrimination level 6 protective switchgear is located between the MV ac busbar and each of the generators G. In discrimination level 5 protective switchgear is located between the MV ac busbar and each of the filters F and between the MV ac busbar and each of the power converters PC. Protective switchgear is located between the MV ac busbar and each of the transformers that are used to connect the first and second MV ac busbars to the first and second LV ac busbars, respectively. In discrimination level 4 protective switchgear is located between each of the transformers and the respective LV ac busbars. In discrimination level 3 protective switchgear is located between the first and second LV ac busbars and each of the large loads and between each of the respective feeds to the minor LV ac busbars. In discrimination level 2, further protective switchgear is located between first and second LV ac busbars and the associated parts of the minor LV ac busbars. In discrimination level I protective switchgear is located between the minor LV ac busbars and each of the minor loads.

A short circuit in any particular discrimination level of the FEP system must trip the associated protective switchgear in that level but must not cause any other protective switchgear to trip. Protective fault current levels are determined entirely by supply impedance and the protective switchgear is only able to interrupt the fault current (i.e., the current flowing in the FEP system during a fault) well after the peak fault current has passed. The fault current is therefore normally only interrupted at, or very shortly after, line current reversals.

The conventional FEP system shown in FIG. 1 has the following technical disadvantages.

The magnitude of the fault current is influenced by the number and type of generators G that are on-line on a particular point of common coupling; the lower the combined generator impedance the greater the fault current. Wide variations in prospective fault current occur and protection equipment setting may have to be continuously adjustable to guarantee fault discrimination.

The magnitude of the fault current is increased as distribution voltage (i.e. the voltage carried by the various ac busbars in the FEP system) is reduced. As the total installed power rating is increased and/or distribution voltage is reduced, the resulting fault current may exceed the capability of the available protective switchgear. Medium voltage power distribution systems may have to resort to the use of load step-down transformers and specialized insulation systems in order to allow a sufficiently high distribution voltage to be used to overcome protective switchgear limitations.

The characteristics of the generators G may vary widely in terms of time dependency and peak magnitudes of ac and dc components to aid load sharing. (Automatic Voltage Regulators (AVRs) are designed to aid load sharing.) Moreover, these characteristics are greatly influenced by the type of prime movers (diesel engine D or turbine T, for example) that is coupled to the generator and their resultant coupled governed and regulated responses may be subject to significant disparities. When a group of generators G is connected to a point of common coupling then disparities often become problematic, particularly during the switching of passive circuits such as filters and transformers and during load transients.

The FEP system is often split into multiple points of common coupling that are often referred to as "islands". All islands may be connected together in parallel to give a single island arrangement (e.g., for single engine running) or may be separated to provide redundancy and graceful degradation of capability following equipment failures. Synchronization and load transfer between individual islands is complicated, particularly when they have different degrees of harmonic pollution and when the disparities mentioned above are present. Propulsive power is normally drawn from the islands in a Propulsion Distribution System (PDS) and other loads can be fed by islands in a Ship Service Distribution System (SSDS) whose power is usually derived from the PDS. Protective discrimination and quality of power supply are usually related by common hierarchy that extends from the largest generator G down to the smallest electrical load. Means must be provided to decouple the relatively sensitive SSDS from the potentially harmful effects of the relative robust power and propulsion equipment in the PDS. Critical electrical loads may require local high integrity power supplies of their own with dedicated power conversion and energy storage equipment in order to attain the required degree of decoupling from the PDS. These local power supplied are often referred to as Zonal Power Supply Units (ZPSU) and their energy stores are often referred to as Zonal Energy Stores (ZES).

Since the FEP system is an ac system a number of variables can affect its design. These include inter alia voltage, frequency, phase angle, power factor, point in cycle switching events, phase imbalance, integer and non-integer harmonic distortion. Because it is a complex ac system it is recognized that it is very difficult to damp the inevitable resonant modes between stray and intentional impedances that affect such a power distribution system. Once an ac distribution frequency (i.e. the frequency of the ac current carried by the various ac busbars in the FEP system) has been chosen then this will greatly influence the generator topology and ultimately places limits on the shaft speed of the prime mover. In many cases, this will adversely affect the size and performance of the generator and the prime mover.

Whilst most conventional FEP systems distribute ac current at medium voltage (MVAC), it is also known to distribute dc current at low voltage (LVDC). Although these LVDC systems derive their dc current from MVAC current supplies via current limited power electronics, they rely on dc circuit breakers (DCCB) to interrupt significant fault currents.

For example, an SSDS may use phase-controlled transformer rectifiers to derive a LVDC distribution voltage from a conventional MVAC distribution system. Parallel redundant feeders distribute the LVDC distribution voltage through switchboards that include fault current-rated DCCBs. Each ZPSU is fed from a redundant pair of these switchboards via interposing regulated power electronics and anti-backfeed diodes.

Another SSDS may use transformer-isolated back-to-back pulse width modulated (PWM) voltage source inverters (often referred to as MV/LV link converters) to derive the LVDC distribution voltage from a conventional MVAC distribution system. The LVDC is distributed using a ring main to provide redundancy then via fault current rated DCCBs to ZPSUs and other electrical loads.

Unlike in a conventional ac current distribution system, a dc current distribution system will not experience regular current line reversals. The DCCBs must therefore interrupt fault current by electromechanically causing contacts to open, thereby causing arc voltage to be generated between the contacts. The arc voltage opposes a system voltage that is the sum of the power supply voltage source that causes the fault current to flow and the inductively generated voltage that opposes any reduction in the fault current. This allows the arc voltage to reduce the fault current and eventually completely interrupt it. As the fault current approaches final interruption, the arc voltage will experience a transient increase that is known to stress components that are connected to the SSDS and which generates electromagnetic interference (EMI). This component stress is exacerbated by the summation of the DCCB transient arc voltage and the recovery of the SSDS distribution voltage that results from the interruption of the fault current that flows in the power supply voltage source. It is known to apply surge arresters and snubbers to such power distribution systems to reduce the transient arc voltages and EMI.

It is also known to use hybrid DCCBs that use a series connected combination of power electronic switching devices and electromagnetically actuated electrical contacts such that the power electronic switching devices rapidly switch off, a surge arrester and snubber moderate the resultant voltage transient and the electrical contacts are opened following the interruption of the fault current.

Linear regulator dc power supply units use a technique called "foldback" to limit regulator power device dissipation during short circuit load conditions. A foldback system typically comprises an output current limiting regulator whose reference is output voltage-dependent. If load impedance drops below a particular threshold, the initial action of the current limiting regulator is to cause the output voltage to reduce, followed by a regenerative action that serves to limit the output current and voltage to suitable low levels and limit regulator power device dissipation.

SUMMARY OF THE INVENTION

The present invention provides a marine power distribution and propulsion system comprising:
a first propulsion drive system including a propulsion motor having superconducting windings and a power converter;
a first propulsion power generation system for supplying power to the first propulsion drive system, the first propulsion power generation system including a generator having superconducting windings and a power converter; and
a first power generation system including at least one power source for supplying power to a first service distribution system that includes:
at least one dc distribution busbar for carrying a distribution voltage and a distribution current, and
at least one switchboard.

In general terms, the power distribution system includes at least one power source whose output current is rectified or naturally produces dc current. The output current is preferably limited by fast acting means (such as a power converter, for example) according to a power source foldback and stabilizing characteristic that initially causes maximum prospective fault current to be much larger than for a conventional impedance-limited case, and that subsequently causes the output current to be commutated in a coordinated action. The power source foldback and stabilizing characteristic also facilitates current sharing between parallel-connected power sources by incorporating a steady state droop component. Moreover, the power source foldback and stabilizing characteristic also facilitates the stabilization of the distribution voltage by incorporating an appropriate transient response that is superimposed on the steady state droop component.

When a low impedance fault is applied to the marine power distribution and propulsion system, the action of the at least one power source is eventually to cause the fault current to be interrupted according to a foldback method. While the fault current interruption progresses, sensors associated with the protective switchgear in the switchboard that is associated with the path of the fault current, and an associated electronic processor, detect the fault and determine that protective switchgear must be opened. Once the fault has been interrupted, the electronic processor determines that this is the case and instructs the protective switchgear (optionally an off-load type switchgear) to open.

A number of electrical loads may be connected to the marine power distribution and propulsion system and these are all electronically regulated by fast acting means (such as a power converter, for example) according to a particular load shedding and stabilizing characteristic that causes load current to be removed in a manner that is coordinated with the above-mentioned commutation of the output current of the at least one power source. When the protective switchgear is opened, the effect of the removal of load current is such as to allow the output voltage of the at least one power source to recover according to a foldback method. The recovery of this output voltage initiates the re-application of the electrical loads according to a load shedding method. The load shedding and stabilization characteristic also causes a particular transient response of load current with respect to the supply voltage to be superimposed on the steady state response of the electrical loads.

The above method can also be initiated by other failure modes that are detected by other sensors and the electronic processor, or by specific electronic processor commands, by a method of inter-tripping. All aspects of the method are preferably programmable by suitable means. The marine power distribution and propulsion system does not require serial communication between the at least one power source, protective switchgear and electrical loads in order to operate because distributed intelligence and an effective means of communication is provided by the power distribution system itself. All the component parts of the marine power distribution and propulsion system can operate automatically and autonomously. However, if serial communication is provided then the marine power distribution and propulsion system is capable of benefiting from increasing intelligence and automation. Local manual controls may be provided for all component parts.

Power is preferably distributed through the marine power distribution and propulsion system and in particular to one or more zonal power distribution sub-systems that incorporate zonal energy stores. More particularly, each zonal power distribution sub-system includes a zonal power supply unit for supplying power to at least one electrical load, and a zonal energy store connected to the at least one switchboard of the first service distribution system for supplying power to the zonal power supply unit. These zonal energy stores are inherently capable of supporting reversible power flow. The zonal energy stores may be charged from the first service distribution system in order to provide continuous power to electrical loads connected to the zonal power supply unit despite interruptions in the distribution voltage. However, the zonal energy stores may also supply power back to the first power distribution system to assist in the stabilization of the distribution voltage.

Power converters are preferably employed to adapt the outputs of all power sources to the appropriate dc distribution voltage and to provide fault current limitation. This allows for greater design freedom and the optimization of power generation equipment. All electrical loads are also preferably conditioned by power converters, which actively assist in stabilizing the distribution voltage and limit fault currents and switching transients. The marine power distribution and propulsion system, and in particular the protective switchgear, need only be optimized for its continuous running loads since fault currents and switching transients are limited by active means.

The marine power distribution and propulsion system preferably has a highly redundant and reconfigurable topology to provide graceful degradation. This is particularly important if the marine power distribution and propulsion system is used on naval ships or submarines where it must continue to provide power to critical systems even if component parts are damaged. The stability of the marine power distribution and propulsion system means that heavy pulsed loads (such as kinetic energy (KE) projectile and unmanned aerial vehicle (UAV) launchers, for example) can be supplied. The proportion of power drawn by any electrical load may be continuously adjusted to optimize efficiency and facilitate "bump-free" transitions between single island and multiple island configurations. The distribution voltage may be lower than in conventional power distribution systems, with respect to total installed power generation capacity, thereby reducing insulation requirements and maximizing power density.

The operation of the marine power distribution and propulsion system is essentially automatic but may incorporate manual reversionary modes. All critical component parts are preferably intelligent and autonomous. The intelligence may be summarized as follows.

When a power source (such as a generator, for example) is started, its associated power converter regulates the output voltage and ramps it to just below a desired output voltage. The associated protective switchgear detects this state of readiness and closes. The power source is safe against back-feed, senses that it is on-line and transits to its specified output characteristic.

When a serious overload occurs, the fault current is limited by the power source foldback and stabilizing characteristic. The protective switchgear rapidly locates and classifies the fault by reference to its sensors. If the fault persists, the power source foldback and stabilizing characteristic causes the output voltage to reduce. All electrical loads shed or revert to zonal energy stores. The protective switchgear senses that it is safe to open the affected output. When the fault is removed, all other electrical loads being shed or having reverted to zonal energy stores, the output voltage recovers according to the power source foldback and stabilizing characteristic and the load shedding and stabilizing characteristic is removed.

The propulsion motor of the first propulsion drive system can be regulated according to a load shedding and stabilizing characteristic. More particularly, the power converter of the first propulsion drive system is preferably regulated by a regulator. The regulator controls the propulsion motor and the power converter of the first propulsion drive system in such a way as to meet the propulsion needs of the marine vessel but always subject to the requirements of the load shedding and stabilizing characteristic. In practice, a propulsion drive comprising a propeller, a propulsion motor and a power converter will respond to operator commands (e.g., demand signals provided directly from the control levels of the marine vessel) providing this response will not destabilize the marine power distribution and propulsion system, except when the distribution voltage is low such as during a protective foldback event or when demanded load power is greater than the available power generation capacity, for example. When the response of the propulsion drive would destabilize the marine power distribution and propulsion system then its load will preferably be regulated and/or progressively shed as required to stabilize the distribution voltage.

The power converter of the first propulsion power generation system can be regulated according to a power source foldback and stabilizing characteristic.

The power converter of the first propulsion power generation system is preferably connected to one or both of the power converter of the first propulsion drive system and the at least one switchboard of the first service distribution system. The power converter of the first propulsion drive system is preferably connected to the at least one switchboard of the first service distribution system.

The at least one power source of the first power generation system is preferably connected to the at least one switchboard of the first service distribution system by a power converter.

The zonal energy store of the zonal power distribution sub-system is also preferably connected to the at least one switchboard of the first service distribution system by a power converter. In both cases, the power converter is preferably a pulse width modulated dc/dc converter.

The dc/dc converter between the zonal energy store of the zonal power distribution sub-system and the at least one switchboard of the first service distribution system is preferably polarized as a step-up chopper when power flows from the first service distribution system into the zonal energy store of the zonal power distribution sub-system, and the dc/dc converter is polarized as a step-down chopper when power flows from the zonal energy store of the zonal power distribution sub-system into the first service distribution system.

The at least one switchboard of the first service distribution system preferably includes protective switchgear with contacts. The power converter connecting the at least one power source of the first power generation system to the at least one switchboard of the first service distribution system is preferably regulated according to a power source foldback and stabilizing characteristic, and the at least one electric load is preferably regulated according to a load shedding and stabilizing characteristic. The contacts of the protective switchgear are made to open only when the distribution voltage and the distribution current have been reduced to acceptable levels by the interaction of a power source foldback and stabilizing characteristic with one of (a) a fault that causes an excessively low impedance to be connected across the distribution voltage, (b) an overriding inter-tripping command that is automatically generated within the marine power distribution and propulsion system, (c) an overriding inter-tripping command that is manually generated within the marine power distribution and propulsion system, and (d) an overriding inter-tripping command that is generated remotely. Moreover, the contacts of the protective switchgear are made to close only when the polarity of the voltage across the contacts is such that any transient or inrush currents will be restricted by one of (a) the power source foldback and stabilizing characteristic and the power source starting sequence, and (b) a load shedding and stabilizing characteristic.

The distribution voltage is preferably stabilized by a transient load line function of a power source foldback and stabilizing characteristic and by a limitation of rate of change of load current function of the load shedding and stabilizing characteristic.

The first power generation system can include a plurality of parallel-connected power sources for supplying power to the first service distribution system, wherein the steady state current sharing of the plurality of power sources is coordinated by a steady state droop function of a power source foldback and stabilising characteristic of each power source, and wherein the transient current sharing of the plurality of power sources is coordinated by a transient load line function of the power source foldback and stabilising characteristic of each power source.

The output voltage and output current of the at least one power source of the first power generation system can be regulated such that current flow is uni-directional. A steady state output voltage is the sum of an off load bus voltage setpoint and a steady state droop component that is proportional to load current such that the steady state output voltage is in accordance with a steady state load line. Transient load current variations about a steady state loading point cause the output voltage to follow a transient load line whose gradient is less than the gradient of the steady state load line. Steady state current is limited to a particular level. If load current transiently exceeds the steady state current limit and approaches, but does not exceed, a particular transient current limit level, the output voltage will transiently reduce with respect to the steady state load line and will recover to the steady state load line when the steady state current reduces below the steady state current limit. If load current continuously exceeds the steady state current limit, or exceeds the particular transient current limit level, foldback is applied such that the output voltage and the output current reduce substantially to zero according to a regenerative process (in some circumstances it may be beneficial for the output current to reduce to a very low level (e.g., about 2 A) to facilitate the sensing of the load impedance), and output voltage and output current remain at substantially zero until load impedance has increased beyond a particular level. If load impedance increases beyond the particular level then load voltage initially partially recovers and then is ramped up to a desired operating point.

The load voltage can be ramped up to the desired operating point according to a time-variable ramp rate that is specified to minimize resultant voltage transients within the marine power distribution and propulsion system.

The power distribution system may further comprise a second power generation system including at least one power source for supplying power to a second service distribution system. The second service distribution system preferably includes at least one dc distribution busbar for carrying a distribution voltage and a distribution current, and at least one switchboard that includes protective switchgear with contacts. The zonal energy store of the zonal power distribution system can be connected to the at least one switchboard of the second service distribution system. In this way, the zonal energy store can be supplied from the first service distribution system and/or the second service distribution system.

The marine power distribution and propulsion system can further include a second propulsion drive system including a propulsion motor and a power converter. A second propulsion power generation system for supplying power to the second propulsion drive system preferably includes a generator and a power converter.

Each of the first and second propulsion drive systems may include a propeller that is driven by the respective propulsion motor. Alternatively, the propulsion motors of the first and second propulsion drive systems may be used to drive a common propeller (so-called tandem propulsion drives). The propulsion motors forming a tandem propulsion drive may be integrated or separate but will share the same propeller shaft system. It will be readily appreciated that an individual marine vessel may use any particular number and configuration of propulsion drives depending on its propulsion requirements. The propellers may be of any convenient type such as conventional multi-bladed screws or ducted pump jets, for example.

Each of the first and second propulsion power generation systems may include a prime mover (such as a turbine, for example) that drives the respective generator.

The propulsion motors of the first and second propulsion drive systems preferably have high temperature superconducting (HTS) windings. More particularly, one or both of the field windings and the armature windings may be made from cables, tapes or wires formed from, or including, any suitable HTS material (i.e., a material that typically retains superconducting properties (zero resistance and an ability to carry very high current density) at more than about 25 K).

The field windings will typically be located on the rotor and the armature windings will typically be located on the stator of the propulsion motors, but the opposite arrangement is also possible. One or both of the rotor and stator of the propulsion motors may also include bulk HTS material and it will be readily appreciated that the term "windings" as used herein should be taken to include bulk HTS material that may not be configured in a conventional winding pattern. For example, the bulk HTS material may form part of a superconducting magnetic system as described in British Patent Application 2431519 where a layer of magnetic material switchable between two magnetic states (diamagnetic, ferromagnetic, for example) using thermal means is arranged to repeatedly flux pump a magnetic field to magnetize or demagnetize the bulk HTS material. In the case where only one of the rotor and the stator has superconducting windings then the other may have conventional copper windings or permanent magnets, for example.

In normal operation, it is anticipated that the HTS windings will be held at between 30 K and 77 K because this removes the need to use liquid helium as the coolant and because the current density that an HTS conductor can sustain is temperature dependent (sustainable current density increases as temperature is reduced). The designed operating temperature of the HTS windings is therefore the result of a trade off between desired current density and the practical performance limitations of the associated cryogenic cooling plant. The use of HTS windings allows the propulsion motors to operate with exceptionally high air-gap shear stress compared to conventional motors. The principal benefits are greatly increased power density and efficiency.

The propulsion motors may be singly or doubly fed by the associated power converters of the first and second propulsion drive systems.

The power electronics for the power converters of the first and second propulsion drive systems are advantageously fully integrated with the propulsion motors. The power converters will preferably be designed to maximize the performance of the associated propulsion motor and aid power distribution system stability. The propulsion motors of the first and second propulsion drive systems may also have an electronic commutator circuit using static power electronics.

The propulsion motors of the first and second propulsion drive system will normally include a rotor and a stator and the rotor can be coaxially inside or outside the stator.

The at least one dc distribution busbar can be implemented using superconducting cabling or busbar. Such superconducting cabling may be made of cables, tapes or wires formed from, or including, any suitable HTS material.

The generators of the first and second propulsion power generation systems preferably have HTS windings. More particularly, one or both of the field windings and the armature windings may be made from cables, tapes or wires formed from, or including, any suitable HTS material. The field windings will typically be located on the rotor and the armature windings will typically be located on the stator of the generators, but the opposite arrangement is also possible. One or both of the rotor and stator of the generators may also include bulk HTS material. In the case where only one of the rotor and the stator has superconducting windings then the other may have conventional copper windings or permanent magnets, for example.

The use of HTS windings allows the generators to operate with exceptionally high air-gap shear stress compared to conventional generators. The principal benefits are greatly increased power density and efficiency.

The power electronics for the power converters of the first and second propulsion power generation systems are advantageously fully integrated with the generators. The generators of the first and second propulsion power generation systems may also have an electronic commutator circuit using static power electronics. One problem with generators that employ HTS windings is their relatively high prospective fault current. This may be overcome by using a power converter that limits the fault current in the power distribution system, whilst maintaining a high quality of power supply and aiding power distribution system stability.

It will be readily appreciated that generators and propulsion motors employing HTS windings are extremely compact and lightweight and offer the highest electrical efficiency, and in combination with a slotless armature winding, produce low levels of noise and vibration. This makes them particularly suitable for use on marine vessels. The generators, propulsion motors and associated power converters will preferably be capable of aiding power distribution stability and availability by a process of programmed power management and graceful degradation.

The power converter of the second propulsion power generation system is preferably connected to one or both of the power converters of the second propulsion drive system and the at least one switchboard of the second service distribution system. The power converter of the second propulsion drive system is preferably connected to the at least one switchboard of the second service distribution system.

The power converter of the first propulsion power generation system is preferably connected to the power converter of the second propulsion drive system. The power converter of the second propulsion power generation system is preferably connected to the power converter of the first propulsion drive system.

The first propulsion drive system preferably has three power supply inputs, each input being selectable (by means of a system of manually connected links or other suitable means of isolation, for example). The first power supply input may be connected to the first propulsion power generation system, the second power supply input may be connected to the second propulsion power generation system, and the third power supply input may be connected to the at least one switchboard of the first service distribution generation system. The first propulsion drive system may therefore be supplied with power by the first propulsion power generation system through the first power supply input and/or by the second propulsion power generation system through the second power supply input. Power can also be supplied to the first propulsion drive system from the first service distribution system through the third power supply input. If the first propulsion drive system is operated in a regenerative mode then it can also be used to supply power to the first service distribution system.

The second propulsion drive system preferably has three power supply inputs, each being selectable (by means of a system of manually connected links or other suitable means of isolation, for example). The first power supply input may be connected to the first propulsion power generation system, the second power supply input may be connected to the second propulsion power generation system, and the third power supply input may be connected to the at least one switchboard of the second service power distribution system. The second propulsion drive system may therefore be supplied with power by the first propulsion power generation system through the first power supply input and/or by the second propulsion power generation system through the second power supply input. Power can also be supplied to the second propulsion drive system from the second service distribution system through the third power supply input. If the second propulsion drive system is operated in a regenerative mode then it can also be used to supply power to the second service distribution system.

If the switchboards of the first and second service distributions systems are interconnected or cross linked then further redundancy between the two sides of the power distribution system can be provided.

The first propulsion power generation system preferably has first and second power supply outputs, each being selectable (by means of a system of manually connected links or other suitable means of isolation, for example). The first power supply output may be connected to the first power supply input of the first propulsion drive system and the second power supply output may be connected to the first power supply input of the second propulsion drive system. The first propulsion power generation system may therefore supply power to the first propulsion drive system through the first power supply output and/or the second propulsion drive system through the second power supply output. If the first propulsion power generation system has a third power supply output that is selectable and is connected to the at least one switchboard of the first service distribution system then power can also be supplied to the first service distribution system.

The second propulsion power generation system preferably has first and second power supply outputs, each being selectable (by means of a system of manually connected links or other suitable means of isolation, for example). The first power supply output may be connected to the second power supply input of the first propulsion drive system and the second power supply output may be connected to the second power supply input of the second propulsion drive system. The second propulsion power generation system may therefore supply power to the first propulsion drive system through the first power supply output and/or the second propulsion drive system through the second power supply output. If the second propulsion power generation system has a third power supply output that is selectable and is connected to the at least one switchboard of the second service distribution system then power can also be supplied to the second service distribution system.

The marine power distribution and propulsion system may be configured such that power can be supplied to the first service distribution system through the at least one switchboard by one or more of the following: the first power generation system, the zonal energy store of the zonal power distribution sub-system, a propulsion drive system operating in a regenerative mode, a propulsion power generation system, and a remote power supply system such as a shore-based power supply, for example. This provides a considerable degree of redundancy.

The at least one power source of the first power generation system is preferably one or more of the following: a diesel generator, a gas turbine generator, a steam turbine generator, a combined cycle gas and steam turbine generator, a closed cycle (non-air breathing) diesel generator, a battery, a fuel cell, a flow cell, a flywheel generator, a super-capacitor (i.e., a capacitor with extremely high capacity and capacitive energy density), and a superconducting magnetic energy store. This should not be considered an exhaustive list and it will be readily understood that other power sources can be used. In the case where the at least one power source of the first power generation system is a generator then it may optionally employ HTS windings. The power electronics of any associated power converter may also be fully integrated with the generator.

The at least one switchgear may include distribution busbars, incoming busbars, outgoing busbars. At least one electromechanically actuated off-load double pole switch is preferable connected to the distribution busbars. The at least one switchgear is preferable controlled by an electronic control system that includes an electronic processor, current sensor on all distribution busbars, incoming busbars and outgoing busbars, voltage sensors of all distribution busbars, incoming busbars and outgoing busbars, inter-tripping inputs, inter-tripping outputs and drivers for switch actuators. The electronic control system may also include a local operator interface and a remote control interface.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 2:
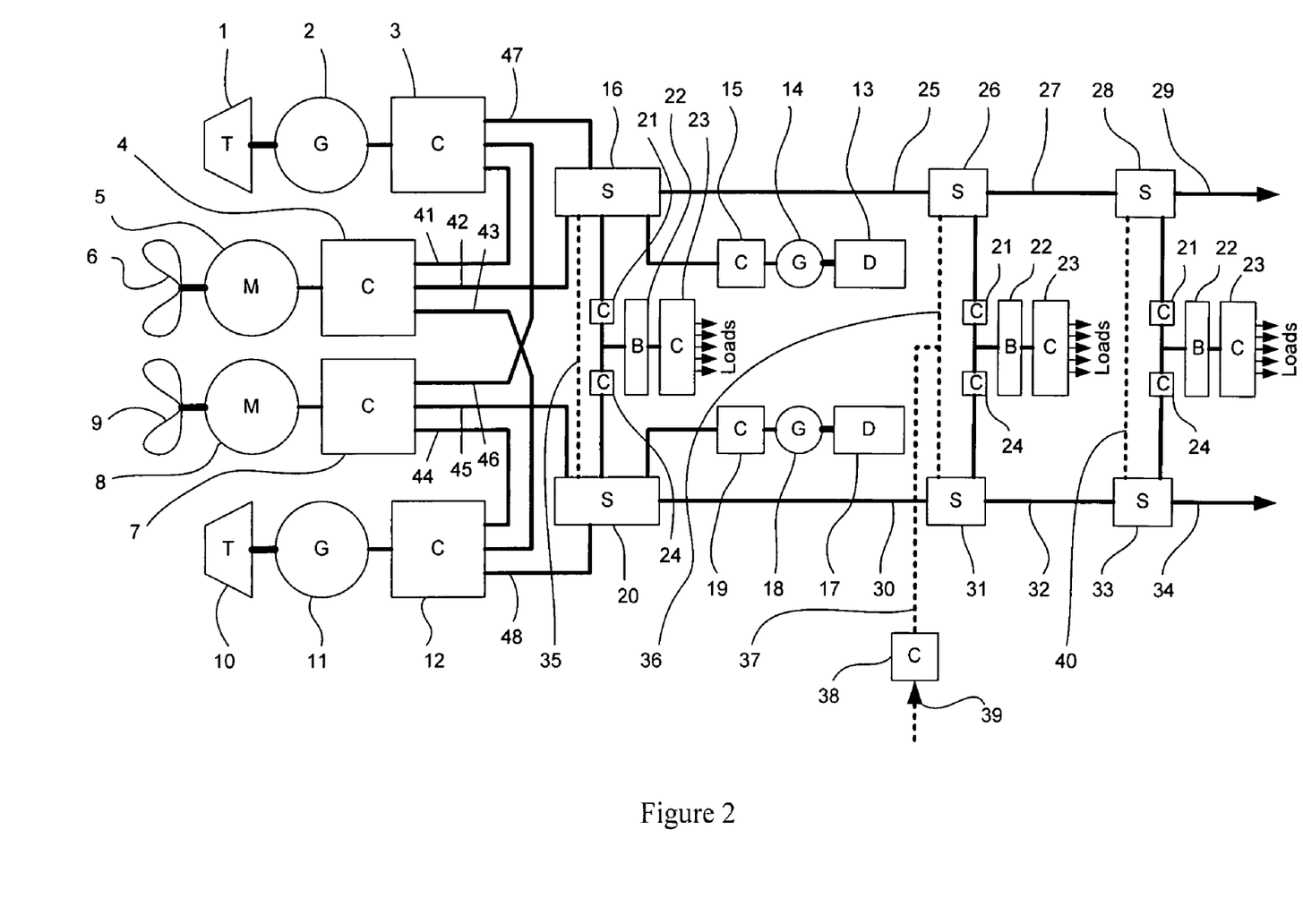
FIG. 2 is a schematic diagram of a marine power distribution and propulsion system according to the present invention.

The basic topology of a marine power distribution and propulsion system according to the present invention will now be described with reference to FIG. 2. It should be appreciated that all of the inputs, outputs, terminals and interconnections of FIG. 2 are of double pole direct current type.

A first Propulsion Power Generation System (PPGS) includes a turbine 1 that drives a generator 2 to supply power to an output converter 3. Similarly, a second PPGS includes a turbine 10 that drives a generator 11 to supply power to an output converter 12. A first Propulsion Drive System (PDS) includes a propeller 6 that is driven by a propulsion motor 5 whose power flow is regulated by a propulsion converter 4. Similarly, a second PDS comprises a propeller 9 that is driven by a propulsion motor 8 whose power flow is regulated by a propulsion converter 7. The output converters 3 and 12 each have three sets of output terminals and the propulsion converters 4 and 7 each have three sets of input terminals, all such terminals have linking arrangements that will be described in more detail below.

The generators 2 and 11 employ high temperature superconducting (HTS) rotor windings and the output converters 3 and 12 are fully integrated with the electrical machines. In other words, the generators 2 and 11 are provided with integrated power electronics. Generators using HTS rotor windings will have very low reactance and this would normally cause complications if they were connected to a conventional ac power distribution system. These complications include high prospective short circuit fault current, high prospective short circuit fault torques and high admittance to distribution voltage distortion, all of which would severely constrain the design of such a generator. However, the integrated power electronics effectively decouple the generators 2 and 11 from the rest of the marine power distribution and propulsion system, eliminating the complications mentioned above and giving the generator designer greater freedom from the design constraints associated with those complications. Excitation of the generators 2 and 11 may be optimized with respect to operating efficiency and reliability, taking into consideration the safe working of cryogenic systems.

The generators 2 and 11 may employ an "active" stator with an electronic commutator circuit using static power electronics that provides the designer with greater flexibility to increase performance. The power electronics are modular and fully integrated within the electrical machine, sharing cooling systems, ancillary systems, structures and enclosures to achieve a high power density.

The output converters 3 and 12 are regulated according to a power source foldback and stabilizing characteristic as described in more detail below. The low fault reactance of the generators 2 and 11 and the large amount of energy that is stored in the HTS rotor windings means that the output voltage of the generators is unlikely to be reduced sufficiently quickly to protect the power electronics of the associated output converters 3 and 12 in the event of a serious failure mode. This means that almost all serious failure modes will result in permanent damage within the associated output converters unless additional protective means are employed. Each output converter 3 and 13 may therefore include a number of parallel connected channels each one being protected by a fast acting fuse, for example. In other words, the output converters 3 and 12 may be designed in a manner that provides graceful degradation following successive failure modes.

The turbines 1 and 10 can be steam or gas turbines, for example, operating in simple or combined cycles. Gas turbines may be single or multi-spool types operating in simple or intercooled and/or recuperated cycles. It will be readily appreciated that diesel and hot air engines could be used in place of the turbines depending on the particular circumstances.

The propulsion motors 5 and 8 employ HTS rotor windings and the propulsion converters 4 and 7 are fully integrated with the electrical machines. In other words, the propulsion motors 5 and 8 are provided with integrated power electronics. The propulsion motors 5 and 8 may be located within the hull of the marine vessel (i.e., an in-board propulsion motor driving a propeller via a shaft line with a stern gland), in a pod that is suspended below the hull of the marine vessel to provide both propulsion and steering or coaxially outside the hull of a submarine. The propulsion motors 5 and 8 may be configured with their rotors coaxially inside or outside their stators. Excitation of the propulsion motors 5 and 8 may be optimized with respect to operating efficiency and reliability, taking into consideration the safe working of cryogenic systems.

The propulsion motors 5 and 8 may employ an "active" stator with an electronic commutator circuit using static power electronics that provides the designer with greater flexibility to increase performance. The power electronics are modular and fully integrated within the electrical machine, sharing cooling systems, ancillary systems, structures and enclosures to achieve a high power density.

The propulsion motors 5 and 8 are regulated according to a load shedding and stabilizing characteristic as described in more detail below.

A first Ship Service Power Generation System (SSPGS) comprises a diesel engine 13 that drives a generator 14 to supply power to an output converter 15. Similarly, a second SSPGS comprises a diesel engine 17 that drives a generator 18 to supply power to an output converter 19. A plurality of zonal power distribution sub-systems each comprise a Zonal Power Supply Unit (ZPSU) 23 that feeds power into a conventional low voltage (LV) distribution system and draws power from a Zonal Energy Store (ZES) 22 that is connected to a first dc/dc converter 21 and a second dc/dc converter 24. In FIG. 2, three zonal power distribution sub-systems are shown, but more or fewer may be used in practice.

The generators 14 and 18 may be implemented using the ALPHA, BETA and GAMMA ranges of salient pole synchronous machines supplied by Converteam of Boughton Road, Rugby, Warwickshire, CV21 1BU, United Kingdom (hereafter referred to as "Converteam"). It will be readily appreciated that the generators 14 and 18 may also be implemented using electrical machines having HTS rotor windings and/or stator windings depending on the particular requirements of the marine power distribution and propulsion system.

The output converters 15 and 19 may be implemented using VDM25000, MV7000 and MV3000 ranges of pulse width modulated (PWM) voltage source inverters supplied by Converteam. It will be readily appreciated that the output converters 15 and 19 may also be implemented in such a way as to be fully integrated with the generators 14 and 18.

The dc/dc converters 21 and 24 and the ZPSU 23 may be implemented using DELTA modules supplied by Converteam.

A first Ship Service Distribution System (SSDS) includes dc distribution busbars 25, 27 and 29 (which may optionally be implemented using HTS cabling or busbars), interposed by switchboards 16, 26 and 28 that are described in more details below. Similarly, a second SSDS includes dc distribution busbars 30, 32 and 34 (which may optionally be implemented using HTS cabling or busbars), interposed by switchboards 20, 31 and 33. In FIG. 2, the first and second SSDS each comprise three switchboards, this quantity being associated with the quantity of zonal power distribution sub-systems shown, but more or fewer may be used in practice. A shore supply 39 is connected to a shore supply output converter 38.

The various component parts of the marine power distribution and propulsion system are interconnected as follows:

The first input of propulsion converter 4 is connected to the first output of output converter 3 by interconnection 41.

The second input of propulsion converter 4 is connected to the first output of output converter 12 by interconnection 43.

The third input of propulsion converter 4 is connected to the first output of switchboard 16 by interconnection 42.

The first input of propulsion converter 7 is connected to the second output of output converter 3 by interconnection 46.

The second input of propulsion converter 7 is connected to the second output of output converter 12 by interconnection 44.

The third input of propulsion converter 7 is connected to the first output of switchboard 20 by interconnection 45.

The output of output converter 15 is connected to the first input of switchboard 16.

The output of output converter 19 is connected to the first input of switchboard 20.

The third output of the output converter 3 is connected to the second input of switchboard 16 by interconnection 47.

The third output of the output converter 12 is connected to the second input of switchboard 20 by interconnection 48.

The supply terminals of dc/dc converter 21 are connected to the second output of switchboard 16.

The supply terminals of dc/dc converter 24 are connected to the second output of switchboard 20.

The cross linking terminals of switchboard 16 are linked to the cross linking terminals of switchboard 20 by cross link 35.

The cross linking terminals of switchboard 26 are linked to the cross linking terminals of switchboard 31 by cross link 36, and to the output terminals of output converter 38 by shore supply link 37.

Similarly, switchboards 26, 28, 31 and 33 are connected to additional zonal power distribution sub-systems.

Similarly, switchboards 28 and 33 are connected by cross link 40.

It will be readily appreciated that the terms "input" and "output" refer to the normal direction of power flow but it may be the case that power will flow out of an input and into an output in certain circumstances. For example, power will normally flow through interconnection 42 from the first output of the switchboard 16 to the third input of the propulsion converter 4. However, if the propulsion motor 5 were to be operated in a regenerative mode than power could flow through interconnection 42 from the third input of the propulsion converter 4 to the first output of the switchboard 16.

The process by which current that flows in a short circuit or low resistance fault is interrupted will now be described with reference to FIG. 3. For the purpose of this description, a fault is considered to occur within dc/dc converter 21. A variable load current flows prior to the fault and the protective action of a power source comprising diesel engine 13, generator 14 and output converter 15 is considered to interrupt the fault. However, it should be noted that the following description is equally applicable to faults that may occur anywhere within the marine power distribution and propulsion system and to any power source that feeds the marine power distribution and propulsion system.

Figure 3:
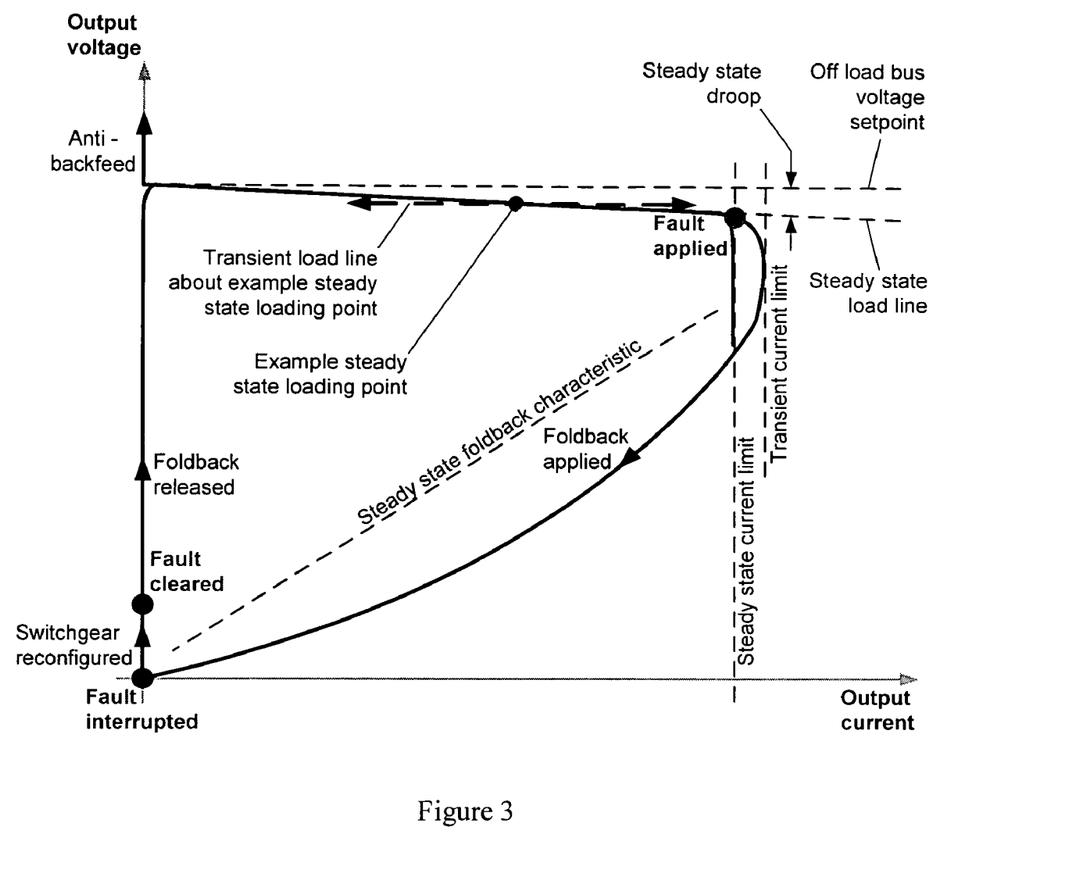
FIG. 3 is a diagram showing the output voltage versus output current characteristic of a power source forming part of the marine power distribution and propulsion system of FIG. 2.

FIG. 3 shows the characteristic of output voltage against variable output current for a power source comprising the diesel engine 13, the generator 14 and the output converter 15. The diesel engine 13 is governed by a conventional governor and is set to run at any convenient rotational speed. The generator 14 is regulated by a conventional Automatic Voltage Regulator (AVR) and generator output voltage is set to any convenient level. The output converter 15 is regulated by a regulator (not shown) according to a foldback and stabilizing characteristic shown in FIG. 3; this characteristic being substantially independent of the actions of the conventional governor and AVR. Any convenient type of regulator may be used for the purpose of regulating the output converter 15, but a programmable digital regulator would be the preferred type.

An off load bus voltage setpoint (the "setpoint") is provided to the regulator of the output converter 15 and all other regions of the foldback and stabilizing characteristic are derived from this. In normal operation as the load current in the dc/dc converter 21 is progressively increased, the output current in the output converter 15 also progressively increases and the output voltage of the output converter 15 reduces according to a steady state load line which droops with respect to the setpoint according to the steady state droop. The steady state droop may be proportional to output current or it may conform to any other suitable characteristic. By fast acting regulator action, transient changes in the load current and the equivalent output current will cause the output voltage to be displaced from the steady state load line. If the steady state average values of output current and voltage are at the steady state loading point shown in FIG. 3, and transient perturbations of output current occur about the steady state loading point, the output voltage will conform to the transient load line about the example steady state loading point. The transient load line is represented in FIG. 3 by the dashed arrows extending on both sides of the steady state loading point and it may be displaced from the steady state load line by a degree that may be proportional to output current transient perturbation, or it may conform to any other suitable characteristic.

The output current is subject to a fast acting overriding transient current limit such that the output voltage is reduced in order to prevent the instantaneous level of output current from exceeding the transient current limit. Load current is also subject to a steady state current limit such that the output voltage is reduced in order to prevent the steady state average level of output current from exceeding the steady state current limit. If the load resistance falls below that of the gradient of the steady state foldback characteristic then foldback is applied. This means that the transient output current limit is reduced to a level that is output voltage dependent, this dependency being such as to cause the regenerative reduction of output current and output voltage. The regenerative action converges upon a point where the output current and the output voltage have been reduced to approximately zero. In practice, when a fault is applied at a time when the steady state output current is approaching the steady state current limit, the output current will rapidly increase until the transient current limit action causes the output voltage to collapse. Foldback is then applied and the fault is said to be interrupted when the output current and the output voltage approach zero. The practical foldback characteristic is such that the minimum level of transient current limit is a small, non-zero, level for reasons that will now be explained.

At the point when the fault current has been practically interrupted, a small, non-zero, level of output current will flow into the load represented by dc/dc converter 21 through protective switchgear in switchboard 16. If this switchgear is opened and is able to interrupt the small, non-zero, current level then the distribution voltage will increase, providing no other load is present.

In the case where no other load is present, the fault is known to be cleared when the distribution voltage increases. Since the load resistance has increased beyond that of the gradient of the steady state foldback characteristic when distribution voltage increases, the regenerative action of the foldback is released and the distribution voltage returns to the level set by the setpoint.

In the case where an additional load is connected in parallel with the dc/dc converter 21, the foldback will not be released if the resistance presented by this load is less than that of the gradient of the steady state foldback characteristic. When multiple loads are connected in parallel, and they must be returned to operation after fault interruption and clearance, it is necessary for them to shed load when the distribution voltage is reduced below normal working levels in order to permit the foldback to be released.

A benefit of the foldback and stabilizing characteristic of the present invention is that protective switchgear is called upon to operate at near zero current-zero voltage conditions, thus avoiding the need to employ conventional switchgear in which complex arc control apparatus is used to oppose direct current. The foldback and stabilizing characteristic also facilitates the parallel connection of multiple and disparate types of power sources since the respective power source output characteristics may be controlled by fast acting regulator functions and power electronics. In this way the natural impedance and response characteristics of disparate generator types can be decoupled.

Figure 4:
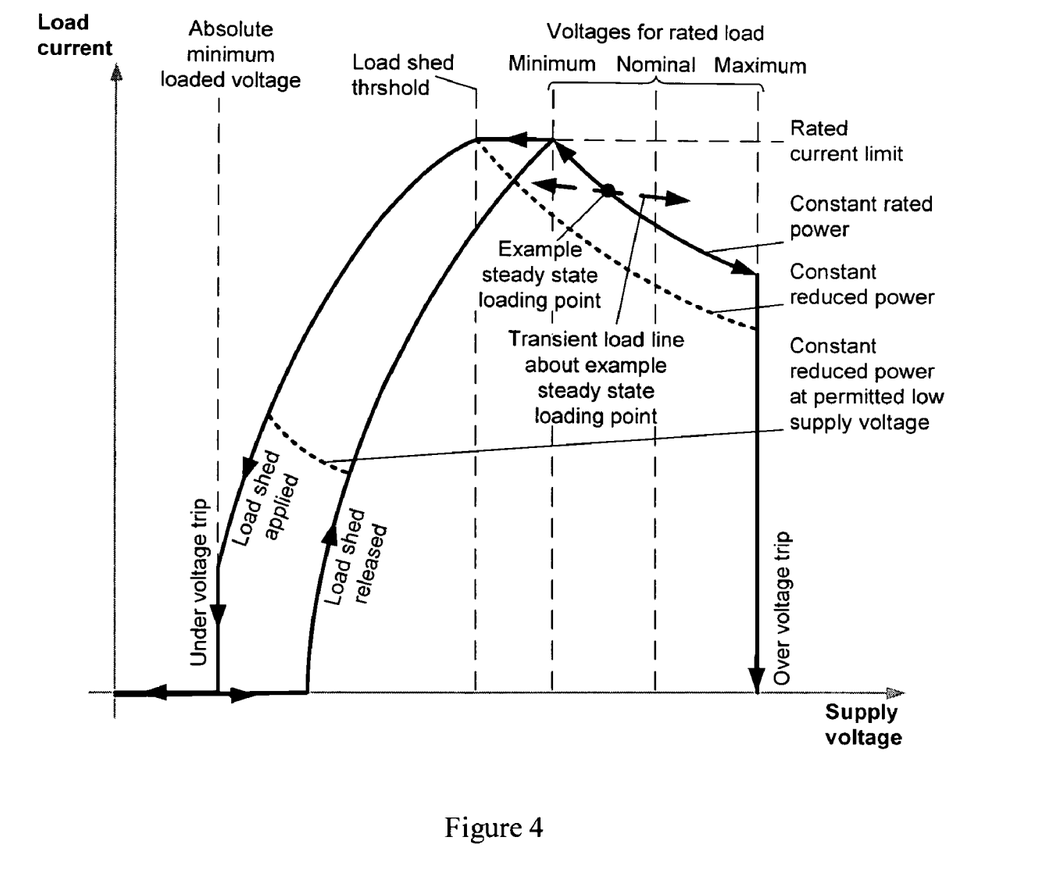
FIG. 4 is a diagram showing the load current versus supply voltage characteristic of an electrical load forming part of the marine power distribution and propulsion system of FIG. 2.

The associated load shedding and stabilizing characteristic will now be described in more detail with reference to FIG. 4. For the purpose of this description, the same fault as was previously described with reference to FIG. 3 is considered to occur within dc/dc converter 21, whilst an additional load is presented by a propulsion drive comprising the propeller 6, the propulsion motor 5 and the propulsion converter 4. This means that the dc/dc converter 21 and the additional load are connected in parallel. A variable load current flows prior to the fault and the protective action of a power source comprising the diesel engine 13, the generator 14 and the output converter 15 is considered to interrupt the fault.

Prior to the occurrence of the fault in the dc/dc converter 21, the output current of the output converter 15 is the sum of the load currents drawn by the dc/dc converter 21 and the propulsion drive. The propulsion drive load is regulated by the regulator that controls the propulsion converter 4. The propulsion drive load may be regulated to achieve constant propulsive power or to satisfy any other operational requirement, but the constant power case serves the purpose of explanation of the load shedding and stabilizing characteristic well. If constant propulsive power is drawn by the propulsion converter 4 then its load current will be approximately inversely proportional to its supply voltage. (A reduction in supply voltage is associated with an increase in load current in order to maintain constant power.) It is known for propulsion converters to have a supply current limit function that prevents the rated current limit from being exceeded when the propulsion converter load is at rated power and supply voltage is reduced below the rated minimum. FIG. 4 shows three curves of supply voltage and load current when at constant power. The uppermost constant power curve is specific to "constant rated power" and this intersects with the lines of rated current limit and minimum voltage for rated load. If the supply voltage is reduced below this intersect then load current is initially held constant at the rated current limit level and propulsion load power is reduced pro rata with the supply voltage. If the supply voltage is reduced below a load shed threshold then load shedding is said to be applied and the load current deviates from the known rated current limit and is regulated according to a first supply voltage dependent current limit. This means that the propulsion load power is reduced according to a higher order law than proportionality with supply voltage. Load shedding is applied until the supply voltage is reduced to a particular absolute minimum loaded voltage, below which it is considered that the distribution voltage has collapsed as a result of a fault and under voltage tripping occurs.

When the under voltage trip occurs, the propulsion drive assumes a controlled state where its supply current is switched off by the propulsion converter 4 and the propulsion drive remains under control to enable a rapid re-start once fault conditions are cleared. The propulsion drive remains in this controlled state until the supply voltage has increased to a particular level where load shedding is released and the load current is permitted to increase according to a second supply voltage dependent current limit until normal (non current limited) working is resumed.

The load shedding characteristic described above is beneficial in allowing a propulsion drive, or any other load, to draw power from a supply, usefully, providing supply voltage is within prescribed limits. The "constant reduced power curve" shows how the supply current would be free from limitation until the supply voltage was reduced to the point where the curve of load current intersects the lines of rated current limit and load shed threshold. The "constant reduced power at permitted low supply voltage" curve shows how supply current would be free from limitation when a propulsion drive was operated at relatively low output power with a supply voltage significantly lower than the range of "voltages for rated load". The ability of a medium voltage drive with, for example, 5 kV nominal supply rating to operate from a SSDS power supply with a nominal supply voltage rating of, for example, 750V is permitted by the present invention and provides a distinct technical advantage over conventional marine power distribution and propulsion systems. Furthermore, the load shedding characteristic below "absolute minimum loaded voltage" in the present invention is beneficial in allowing the power source foldback to be released, providing the protective switchgear is instructed to open in order to clear the fault.

Another aspect of the load shedding and stabilizing characteristic is the regulation of a load to minimize the rate of change of load current that may arise in response to a transient variation in supply voltage or other perturbation within the drive system. In this case, if a load is operating at the "example steady state loading point" (at a supply voltage between minimum and nominal levels) and supply voltage fluctuations occur, the load current will deviate from the constant power curve and will adopt the "transient load line about example steady state loading point". The skilled reader will be aware that the minimum dynamic load resistance that can be applied to a power source, having a particular dynamic source resistance, without incurring instability, is a function of the dynamic source resistance, (i.e., if dynamic load resistance is too low, distribution voltage cannot be stabilized). The load shedding and stabilizing characteristic of the present invention therefore provides the necessary means of ensuring that dynamic load resistance is sufficiently large, with respect to dynamic source resistance, to ensure that distribution voltage stability is achieved. It should be noted that the terms "dynamic source resistance" and "dynamic load resistance" do not imply that actual physical resistance and consequential power dissipation must be employed in order to stabilize the distribution voltage. To the contrary, the terms refer to classical control functions that mimic the effects and transfer functions of equivalent passive components. The load shedding and stabilizing characteristic also facilitates the parallel connection of more than one load to a point of common coupling and load sharing is effective over a wide range of supply voltages. When groups of loads and power sources are connected in parallel, the total dynamic load resistance that is experienced by the group of power sources is the parallel combination of the load characteristics and these may be programmed to achieve stable operation with the maximum designed dynamic source resistance. As parallel connected power sources are added to the distribution network, dynamic source resistance is reduced and stability margins will increase.

In the power distribution topology of FIG. 2, the dc/dc converters 21 and 24 may be routinely called upon to operate as loads for part of the time, and as power sources for the remainder of the time. When charging a ZES 22 and/or feeding power to a ZPSU 23, the regulators of the dc/dc converters 21 and 24 must comply with the above-mentioned load shedding and stabilizing characteristic. When a ZES 22 is feeding power into a SSDS via dc/dc converters 21 and 24, the regulators of the dc/dc converters 21 and 24 must comply with the above-mentioned foldback and stabilizing characteristic.

Stepless bidirectional transfer is required between these characteristics. Propulsion drives may also be given the capability for bidirectional power flow.

When a power source is not required or permitted to receive power from another power source, the anti-backfeed region of the foldback and stabilizing characteristic shown in FIG. 3 is employed. By this means, a pre-existing supply voltage may be connected to the output of a power source and its output voltage may be ramped up until the anti-backfeed region of the characteristic is cleared and the power source outputs power. A benefit of the anti-backfeed function is that switchgear for the SSDS may be closed onto a power source output without suffering inrush current or requiring the power source to have the complex synchronizing apparatus normally associated with alternating current distribution systems.

Figure 5:
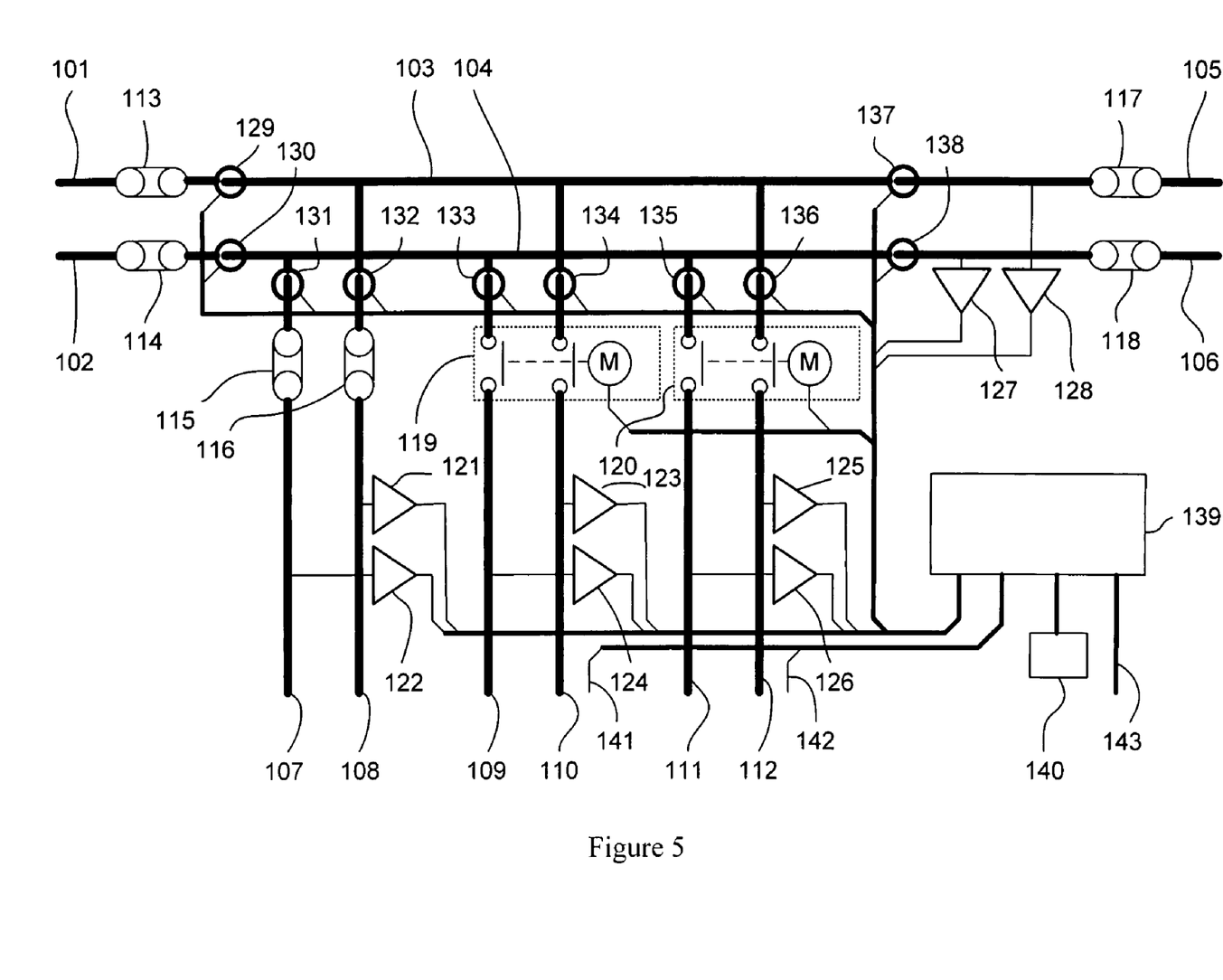
FIG. 5 is a schematic diagram of protective switchgear forming part of the marine power distribution and propulsion system of FIG. 2.

The operation of the protective switchgear within switchboards 16, 26, 28, 20, 31 and 33 will now be described with reference to FIG. 5. It should be noted that FIG. 5 is shown in full double pole format rather than single line format used in FIG. 1 for reasons that will be described in more detail below. The functionality of the switchboards 16, 26, 28, 30, 31 and 33 is in accordance with a generic process and this generic functionality will be described without detailed reference to the exact circuit within any particular switchboard. The detailed circuitry of particular switchboards differs from that of the generic switchboard shown in FIG. 5 only with respect to the number of switched inputs and outputs. It will be appreciated that a switchboard could be produced with any convenient number of inputs and outputs.

The generic switchboard of FIG. 5 includes a plurality of power terminals. Half of the power terminals (namely those labelled 101, 105, 108, 110 and 112) are associated with the positive (+) pole of the direct current system. The other half of the power terminals (namely those labelled 102, 106, 107, 109 and 111) are associated with the negative (−) pole of the direct current system.

Two distribution busbars are also provided. The first busbar 103 is associated with the positive pole of the direct current system and the second busbar 104 is associated with the negative pole of the direct current system. A number of individual links connect the power terminals to the first and second busbars 103 and 104. Half of the links (namely those labelled 113, 117 and 116) are associated with the positive pole of the direct current system. The other half of the links (namely those labelled 114, 118 and 115) are associated with the negative pole of the direct current system.

The switchboard includes two double pole motor driven switches 119 and 120 and a control system. The control system includes an electronic processor 139, a first series of current sensors 129, 137, 132, 134 and 136 associated with the positive pole of the direct current system, a second series of current sensors 130, 138, 131, 133 and 135 associated with the negative pole of the direct current system, a first series of voltage sensors 128, 121, 123 and 125 associated with the positive pole of the direct current system, a second series of voltage sensors 127, 122, 124 and 126 associated with the negative pole of the direct current system, a local operator interface 140, a remote control interface 143, and two inter-tripping interfaces 141 and 142 associated with switches 119 and 120, respectively.

The electronic processor 139 may be implemented using a PECe microcontroller supplied by Converteam. The switches 119 and 120 may be implemented using proprietary motor driven molded case and chassis type High Speed Direct Current Circuit Breakers, suitably interfaced to the PECe microcontroller.

The links 113, 117, 116, 114, 118 and 115 are manually bolted links that enable the user to isolate sections of the marine power distribution and propulsion system, but it will be appreciated that these links could be replaced by additional double pole motor driven switches if desired.

For the purpose of this description the power terminals 111 and 112 are considered to be connected to a power source and power terminals 109 and 110 are considered to be connected to a load.

The switchgear operating process will now be described without detailed reference to the control system. This will be described in more detail below.

When a low resistance fault occurs in the load, fault current flows into the power terminal 112, through the distribution busbar 103, out of the power terminal 110, back into the power terminal 109, through the distribution busbar 104 and out of the power terminal 111. The circuit is completed by the double pole switches 119 and 120. The control system is able to determine that the fault has occurred in the load and facilitates a protective sequence by opening the double pole switch 119 only when zero current flows in this switch. It will be recognized that the double pole switch 120 could also be opened when zero current flows through this switch, but this is not preferred when other loads are connected to the power source by the distribution busbars 103 and 104 because these loads may be reliant upon the resumption of power flow from the power source following the interruption and clearance of the fault described above.

Some of the benefits provided by the control system will now be described.

The electronic processor 139 repetitively samples the signals generated by current sensors 129 to 138 and voltage sensors 121 to 128 with a sufficiently fast response to enable the nature of a fault to be determined. A low resistance fault has been described and the presence of this fault, and its exact nature, would be identified by current sensors 136, 134, 133 and 135 in conjunction with voltage sensors 123 and 124. As long as the sensing and detection of fault current is performed before the foldback process becomes regenerative, and fault current is interrupted, the current sensing is sufficient to identify the inception and location of the fault. Once foldback has become regenerative, fault current has been interrupted and the distribution voltage has collapsed to approximately zero, the electronic processor 139 determines that it is safe to open a switch and switch 119 is opened. As mentioned briefly above, switch 119 would normally be opened in preference to switch 120 if the electronic processor 139 is aware that other loads were being supplied with power prior to the inception of the fault. The presence of other loads would be detected by sensing load current using sensors 129, 132, 137, 130, 131 and 138.

It will be evident that such an electronic processor 139 and comprehensive array of sensors would be able to detect a wide range of other types of fault and that these faults may cause asymmetry of current flow in the positive and negative poles of the direct current system. For example, it is known that a ground fault would cause current to flow in only one pole. Similarly, asymmetry in voltages would occur during a ground fault. It is therefore necessary for the control system to be able to cause the foldback characteristic to be exercised at times when power source output currents are not excessive and this is performed by a process of inter-tripping. If the electronic processor 139 determines that it is necessary to open any particular switch when it is carrying current and distribution voltage is present, it must first cause inter-tripping. In FIG. 5, inter-tripping signals 141 and 142 are dedicated to such communication with the power source connected to terminals 112 and 111, and the load connected to terminals 110 and 109, respectively. If an inter-tripping signal is output to interface 142, the power source that is connected to terminals 112 and 111 must have its foldback characteristic affected, and foldback must be initiated by the receipt of the overriding inter-tripping signal. In another case, a serious fault condition in a load may be such as to warrant inter-tripping. In this case, the receipt of an inter-tripping signal 141 would be interpreted by the electronic processor 139 as being a need to inter-trip the power source using the inter-tripping output 142.

In other cases, the electronic processor 139 may generate inter-tripping sequences in response to other commands including inter alia local operator commands generated by the local operator interface 140 and externally generated commands communicated by the remote control interface 143. It will be appreciated that such an electronic processor 139 could also be equipped with a global inter-tripping interface that would cause all power sources in the marine power distribution and propulsion system to be inter-tripped. It will also be appreciated that the switches 119 and 120 must not open spuriously and that they also must be inter-tripped and inter-locked via electronic processor 139. Such switches may have a manual reversionary operating mode and inter-tripping may be initiated by means of an early break contact, a mechanical interlock and suitable interfacing with the electronic processor.

Figure 6:
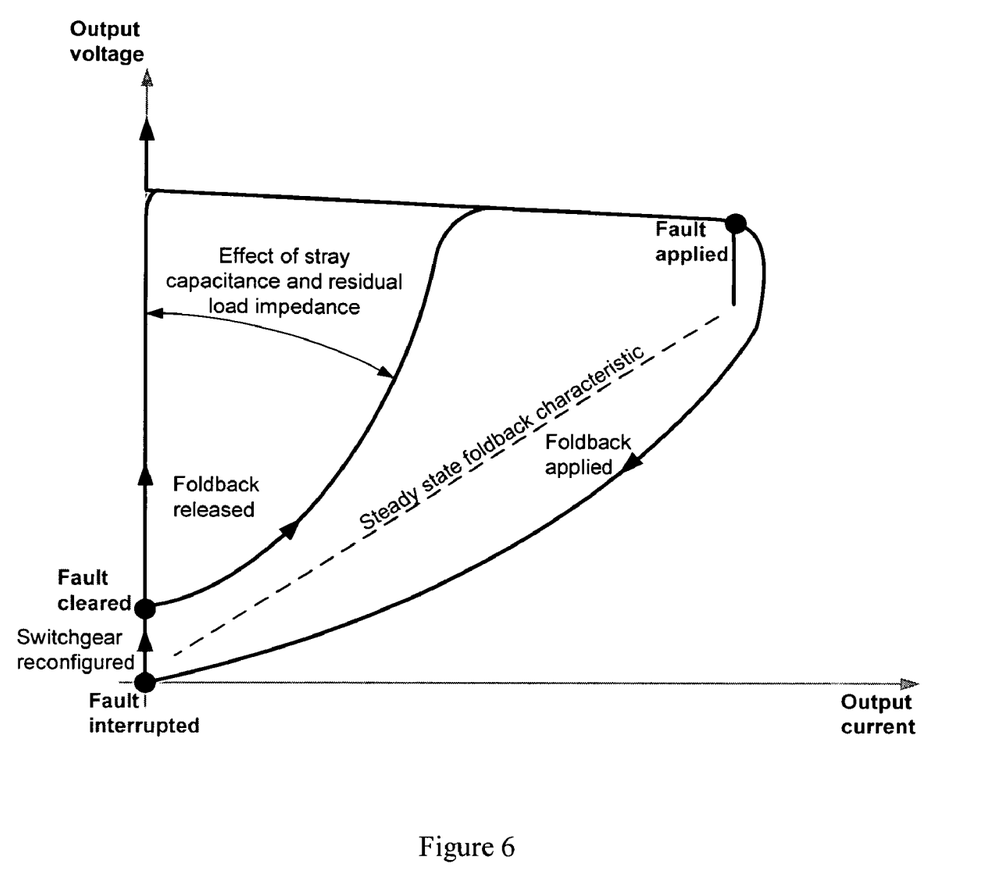
FIG. 6 is a diagram showing the output voltage versus output current characteristic of a power source forming part of the marine power distribution and propulsion system of FIG. 2, where the effect of incomplete load shedding is shown.

It will be appreciated that a large marine power distribution and propulsion system according to the present invention (as used in naval ships or submarines, for example) may incorporate many switchboards of this type. The marine power distribution and propulsion system may be physically extensive and with significant capacitance between positive and negative poles. Practical loads may also have capacitance between positive and negative poles and their load shedding may be imperfect. It will be appreciated that the foldback and stabilizing characteristic described with reference to FIG. 3 does not take these issues into account and the practical characteristic is shown in FIG. 6. In this practical characteristic, the locus of voltage and current when foldback is released indicates the presence of the current that results from the recovery of the distribution voltage after the fault has been cleared.

What is claimed is:

1. A marine power distribution and propulsion system comprising:
   a first propulsion drive system including a propulsion motor having superconducting windings and a power converter;
   a first propulsion power generation system for supplying power to the first propulsion drive system, the first propulsion power generation system including a generator having superconducting windings and a power converter;
   a first service distribution system including:
      a dc distribution busbar for carrying a distribution voltage and a distribution current, and
      a switchboard;
   a first power generation system including a power source and a power converter for supplying power to the first service distribution system, the power source being connected to the switchboard by the power converter of the first power generation system; and
   a zonal power distribution sub-system including:
      a zonal power supply unit for supplying power to at least one electrical load, and
      a zonal energy store connected to the switchboard of the first service distribution system by a power converter and to the zonal power supply unit, the zonal energy store supplying power to the zonal power supply unit.

2. The system of claim 1, wherein the power converter of the first propulsion drive system is regulated according to a load shedding and stabilizing characteristic.

3. The system of claim 1, wherein the power converter of the first propulsion power generation system is regulated according to a power source foldback and stabilizing characteristic and a power source starting sequence.

4. The system of claim 1, wherein the power converter of the first propulsion power generation system is connected to the power converter of the first propulsion drive system.

5. The system of claim 1, wherein the power converter of the first propulsion power generation system is connected to the switchboard of the first service distribution system.

6. The system of claim 1, wherein the power converter of the first propulsion drive system is connected to the switchboard of the first service distribution system.

7. The system of claim 1, wherein the power converter of the zonal power distribution sub-system is a pulse width modulated dc/dc converter.

8. The system of claim 7, wherein the dc/dc converter is polarized as a step-up chopper when power flows from the first service distribution system into the zonal energy store of the zonal power distribution sub-system, and the dc/dc converter is polarized as a step-down chopper when power flows from the zonal energy store of the zonal power distribution sub-system into the first service distribution system.

9. The system of claim 1, wherein the power converter of the first power generation system is a pulse width modulated dc/dc converter.

10. The system of claim 1, further comprising a second service distribution system including:
   a dc distribution busbar for carrying a distribution voltage and a distribution current, and
   a switchboard; and
   a second power generation system including a power source and a power converter for supplying power to the second service distribution system, the power source being connected to the switchboard by the power converter of the second power generation system;
   wherein the zonal energy store of the zonal power distribution sub-system is connected to the switchboard of the second service distribution system by a power converter.

11. The system of claim 10, further comprising:
   a second propulsion drive system including a propulsion motor and a power converter; and
   a second propulsion power generation system for supplying power to the second propulsion drive system, the second propulsion power generation system including a generator and a power converter.

12. The system of claim 11, wherein the power converter of the second propulsion power generation system is connected to the power converter of the second propulsion drive system.

13. The system of claim 11, wherein the power converter of the second propulsion power generation system is connected to the switchboard of the second service distribution system.

14. The system of claim 11, wherein the power converter of the second propulsion drive system is connected to the switchboard of the second service distribution system.

15. The system of claim 11, wherein the power converter of the first propulsion power generation system is connected to the power converter of the second propulsion drive system.

16. The system of claim 11, wherein the power converter of the second propulsion power generation system is connected to the power converter of the first propulsion drive system.

17. The system of claim 11, wherein the first propulsion drive system has three power supply inputs, each input being selectable, and the first power supply input is connected to the first propulsion power generation system, the second power supply input is connected to the second propulsion power generation system, and the third power supply input is connected to the switchboard of the first service distribution generation system.

18. The system of claim 17, wherein the second propulsion drive system has three power supply inputs, each being selectable, and wherein the first power supply input is connected to the first propulsion power generation system, the second power supply input is connected to the second propulsion power generation system, and the third power supply input is connected to the switchboard of the second service power distribution system.

19. The system of claim 17, wherein the first propulsion power generation system has first and second power supply outputs, each being selectable, wherein the first power supply output is connected to the first power supply input of the first propulsion drive system and the second power supply output is connected to the first power supply input of the second propulsion drive system.

20. The system of claim 19, wherein the first propulsion power generation system has a third power supply output that is selectable and is connected to the switchboard of the first service distribution system.

21. The system of claim 17, wherein the second propulsion power generation system has first and second power supply outputs, each being selectable, wherein the first power supply output is connected to the second power supply input of the first propulsion drive system and the second power supply output is connected to the second power supply input of the second propulsion drive system.

22. The system of claim 21, wherein the second propulsion power generation system has a third power supply output that is selectable and is connected to the switchboard of the second service distribution system.

23. The system of claim 1, wherein power is supplied to the first service distribution system through the switchboard by one or more of the following:
- the first power generation system;
- the zonal energy store of the zonal power distribution subsystem;
- a propulsion drive system operating in a regenerative mode;
- a propulsion power generation system; and
- a remote power supply system.

24. The system of claim 1, wherein the power source of the first power generation system is one or more of the following:
- a diesel generator;
- a gas turbine generator;
- a steam turbine generator;
- a combined cycle gas and steam turbine generator;
- a closed cycle (non-air breathing) diesel generator;
- a battery;
- a fuel cell;
- a flow cell;
- a flywheel generator;
- a super-capacitor; and
- a superconducting magnetic energy store.

25. The system of claim 1, wherein the propulsion motor of the first propulsion drive system has high temperature superconducting (HTS) windings.

26. The system of claim 1, wherein the power electronics for the power converter of the first propulsion drive system are integrated with the propulsion motor.

27. The system of claim 1, wherein the propulsion motor of the first propulsion drive system has an electronic commutator circuit using static power electronics.

28. The system of claim 1, wherein the propulsion motor of the first propulsion drive system is mounted within the hull of a marine vessel.

29. The system of claim 1, wherein the propulsion motor of the first propulsion drive system is mounted in a pod of a marine vessel.

30. The system of claim 1, wherein the propulsion motor of the first propulsion drive system is mounted coaxially outside the hull of a marine vessel.

31. The system of claim 1, wherein the propulsion motor includes a rotor and a stator and wherein the rotor is coaxially inside or outside the stator.

32. The system of claim 1, wherein the dc distribution busbar of the first service distribution system is implemented using superconducting cabling or busbar.

33. The system of claim 1, wherein the generator of the first propulsion power generation system has high temperature superconducting (HTS) windings.

34. The system of claim 1, wherein the power electronics for the power converter of the first propulsion power generation system are integrated with the generator.

35. The system of claim 1, wherein the generator of the first propulsion power generation system has an electronic commutator circuit using static power electronics.

36. The system of claim 1, wherein the power converter of the first propulsion power generation system is regulated according to a power source foldback and stabilizing characteristic and a power source starting sequence.

37. The system of claim 1, wherein the switchboard of the first service distribution system includes protective switchgear with contacts, wherein the power converter of the first power generation system is regulated according to a power source foldback and stabilizing characteristic and a power source starting sequence, and wherein the power converter of the first propulsion drive system is regulated according to a load shedding and stabilizing characteristic;
- wherein the contacts of the protective switchgear are made to open only when the distribution voltage and the distribution current have been reduced to acceptable levels by the interaction of the power source foldback and stabilizing characteristic with one of (a) a fault that causes an excessively low impedance to be connected across the distribution voltage, (b) an overriding inter-tripping command that is automatically generated within the marine power distribution and propulsion system, (c) an overriding inter-tripping command that is manually generated within the marine power distribution and propulsion system, and (d) an overriding inter-tripping command that is generated remotely; and
- wherein the contacts of the protective switchgear are made to close only when the polarity of the voltage across the contacts is such that any transient or inrush currents will be restricted by one of (a) the power source foldback and stabilizing characteristic and the power source starting sequence, and (b) the load shedding and stabilizing characteristic.

38. The system of claim 37, wherein the first power generation system includes a plurality of parallel-connected power sources for supplying power to the first service distribution system, wherein the steady state current sharing of the plurality of power sources is coordinated by a steady state droop function of a power source foldback and stabilizing characteristic of each power source, and wherein the transient current sharing of the plurality of power sources is coordinated by a transient load line function of the power source foldback and stabilizing characteristic of each power source.

39. The system of claim 37, wherein the distribution voltage is stabilized by a transient load line function of the power source foldback and stabilizing characteristic and by a limitation of rate of change of load current function of the load shedding and stabilizing characteristic.

40. The system of claim 37, wherein the power source foldback and stabilizing characteristic includes regulating the output voltage and output current of the power converter of the first power generation system such that:
- current flow is uni-directional;
- a steady state output voltage is the sum of an off load bus voltage setpoint and a steady state droop component that is proportional to load current such that the steady state output voltage is in accordance with a steady state load line;
- transient load current variations about a steady state loading point cause the output voltage to follow a transient load line whose gradient is less than the gradient of the steady state load line;
- steady state current is limited to a particular level;
- if load current transiently exceeds the steady state current limit and approaches, but does not exceed, a particular transient current limit level, the output voltage will transiently reduce with respect to the steady state load line and will recover to the steady state load line when the steady state current reduces below the steady state current limit;
- if load current continuously exceeds the steady state current limit, or exceeds the particular transient current limit level, foldback is applied such that the output voltage and the output current reduce substantially to zero according to a regenerative process, and output voltage and output current remain at substantially zero until load impedance has increased beyond a particular level; and
- if load impedance increases beyond the particular level then load voltage initially partially recovers and then is ramped up to a desired operating point.

41. The system of claim 40, wherein the load voltage is ramped up to the desired operating point according to a time-variable ramp rate that is specified to minimize resultant voltage transients within the marine power distribution and propulsion system.

42. The system of claim 1, further comprising an electrical load connected to the switchboard of the first service distribution system by a power converter.

43. The system of claim 42, wherein the switchboard of the first service distribution system includes protective switchgear with contacts, wherein the power converter of the first power generation system is regulated according to a power source foldback and stabilizing characteristic and a power source starting sequence, and wherein the power converter connecting the electrical load to the switchboard of the first service distribution system is regulated according to a load shedding and stabilizing characteristic;
- wherein the contacts of the protective switchgear are made to open only when the distribution voltage and the distribution current have been reduced to acceptable levels by the interaction of the power source foldback and stabilizing characteristic with one of (a) a fault that causes an excessively low impedance to be connected across the distribution voltage, (b) an overriding inter-tripping command that is automatically generated within the marine power distribution and propulsion system, (c) an overriding inter-tripping command that is manually generated within the marine power distribution and propulsion system, and (d) an overriding inter-tripping command that is generated remotely; and
- wherein the contacts of the protective switchgear are made to close only when the polarity of the voltage across the contacts is such that any transient or inrush currents will be restricted by one of (a) the power source foldback and stabilizing characteristic and the power source starting sequence, and (b) the load shedding and stabilizing characteristic.

44. The system of claim 43, wherein the first power generation system includes a plurality of parallel-connected power sources for supplying power to the first service distribution system, wherein the steady state current sharing of the plurality of power sources is coordinated by a steady state droop function of a power source foldback and stabilizing characteristic of each power source, and wherein the transient current sharing of the plurality of power sources is coordinated by a transient load line function of the power source foldback and stabilizing characteristic of each power source.

45. The system of claim 43, wherein the distribution voltage is stabilized by a transient load line function of the power source foldback and stabilizing characteristic and by a limitation of rate of change of load current function of the load shedding and stabilizing characteristic.

46. The system of claim 43, wherein the power source foldback and stabilizing characteristic includes regulating the output voltage and output current of the power converter of the first power generation system such that:
- current flow is uni-directional;
- a steady state output voltage is the sum of an off load bus voltage setpoint and a steady state droop component that is proportional to load current such that the steady state output voltage is in accordance with a steady state load line;
- transient load current variations about a steady state loading point cause the output voltage to follow a transient load line whose gradient is less than the gradient of the steady state load line;
- steady state current is limited to a particular level;
- if load current transiently exceeds the steady state current limit and approaches, but does not exceed, a particular transient current limit level, the output voltage will transiently reduce with respect to the steady state load line and will recover to the steady state load line when the steady state current reduces below the steady state current limit;
- if load current continuously exceeds the steady state current limit, or exceeds the particular transient current limit level, foldback is applied such that the output voltage and the output current reduce substantially to zero according to a regenerative process, and output voltage and output current remain at substantially zero until load impedance has increased beyond a particular level; and
- if load impedance increases beyond the particular level then load voltage initially partially recovers and then is ramped up to a desired operating point.

47. The system of claim 46, wherein the load voltage is ramped up to the desired operating point according to a time-variable ramp rate that is specified to minimize resultant voltage transients within the marine power distribution and propulsion system.

* * * * *